US009383175B2

(12) United States Patent
Walter et al.

(10) Patent No.: US 9,383,175 B2
(45) Date of Patent: Jul. 5, 2016

(54) WALKING FLOOR FOR AN ARMORED VEHICLE, ARMORED VEHICLE HAVING SUCH A WALKING FLOOR, AND METHOD FOR PRODUCING SUCH A WALKING FLOOR

(75) Inventors: Jürgen Walter, Rodgau (DE); Rolf Matthias Alter, Echternach (LU)

(73) Assignee: EC TECHNIK GMBH, Bitburg (DE)

( * ) Notice: Subject to any disclaimer, the term of this patent is extended or adjusted under 35 U.S.C. 154(b) by 65 days.

(21) Appl. No.: 13/881,898

(22) PCT Filed: Nov. 7, 2011

(86) PCT No.: PCT/DE2011/001946
§ 371 (c)(1),
(2), (4) Date: Apr. 26, 2013

(87) PCT Pub. No.: WO2012/059089
PCT Pub. Date: May 10, 2012

(65) Prior Publication Data
US 2013/0205982 A1  Aug. 15, 2013

(30) Foreign Application Priority Data
Nov. 5, 2010 (DE) .......................... 10 2010 050 566

(51) Int. Cl.
*F41H 7/04* (2006.01)
*B32B 3/12* (2006.01)
*F41H 5/04* (2006.01)

(52) U.S. Cl.
CPC  *F41H 7/042* (2013.01); *B32B 3/12* (2013.01); *F41H 5/0471* (2013.01); *Y10T 29/49622* (2015.01); *Y10T 428/24149* (2015.01)

(58) Field of Classification Search
USPC ................... 89/36.02, 36.07–36.09
See application file for complete search history.

(56) References Cited

U.S. PATENT DOCUMENTS

| 3,575,786 | A | 4/1971 | Baker et al. |
| 3,604,374 | A | 9/1971 | Matson et al. |
| 3,806,928 | A | 4/1974 | Costanza |
| 4,198,454 | A | 4/1980 | Norton |
| 4,404,889 | A | 9/1983 | Miguel |

(Continued)

FOREIGN PATENT DOCUMENTS

| DE | 42 34 369 C1 | 3/1994 |
| DE | 4234369 C1 * | 3/1994 |

(Continued)

OTHER PUBLICATIONS

International Search Report (in German with English translation) for PCT/DE2011/001946, mailed Jun. 13, 2012; ISA/EP.

(Continued)

*Primary Examiner* — Michael David
(74) *Attorney, Agent, or Firm* — Harness, Dickey & Pierce, P.L.C.

(57) ABSTRACT

The invention relates to a walking floor for an armored vehicle with a double floor to protect against mine explosions, characterized by a composite panel (10) having at least one core layer (11) made of a honeycomb structure, which is arranged between a first and a second outer layer (12a, 12b) and is connected thereto, wherein retaining means for connecting the composite panel (10) to the vehicle are integrated in the composite panel (10).

19 Claims, 4 Drawing Sheets

(56) References Cited

U.S. PATENT DOCUMENTS

| | | | |
|---|---|---|---|
| 5,517,894 A * | 5/1996 | Bohne et al. | 89/36.02 |
| 5,534,343 A | 7/1996 | Landi et al. | |
| 7,712,823 B2 | 5/2010 | Greuter et al. | |
| 8,627,757 B2 * | 1/2014 | Tobie | F41H 5/007 |
| | | | 89/36.04 |
| 2005/0085146 A1 | 4/2005 | Farkas et al. | |
| 2009/0140545 A1 | 6/2009 | Greuter et al. | |
| 2012/0210861 A1 * | 8/2012 | Tobie | F41H 5/007 |
| | | | 89/36.04 |

FOREIGN PATENT DOCUMENTS

| | | | | |
|---|---|---|---|---|
| DE | 19740103 A1 | 3/1999 | | |
| DE | 10045685 A1 * | 4/2002 | | B62D 25/2072 |
| DE | 103 45 914 A1 | 5/2005 | | |
| DE | 10345914 A1 * | 5/2005 | | F41H 7/04 |
| DE | 20 2004 015490 U1 | 5/2006 | | |
| EP | 0237095 A1 | 9/1987 | | |
| EP | 0 828 134 A2 | 3/1998 | | |
| EP | 1 754 949 A1 | 2/2007 | | |
| EP | 2 180 288 A2 | 4/2010 | | |
| WO | WO-03/058151 A1 | 7/2003 | | |
| WO | WO-03053672 A1 | 7/2003 | | |

OTHER PUBLICATIONS

PCT/DE11/01946 Written Opinion, issued May 8, 2013, 12 pages.

* cited by examiner

WALKING FLOOR FOR AN ARMORED VEHICLE, ARMORED VEHICLE HAVING SUCH A WALKING FLOOR, AND METHOD FOR PRODUCING SUCH A WALKING FLOOR

CROSS-REFERENCE TO RELATED APPLICATIONS

This application is a 371 U.S. National Stage of International Application No. PCT/DE2011/001946, filed on Nov. 7, 2011, which claims priority to German Patent Application No. 10 2010 050 566.8, filed Nov. 5, 2010, the contents of which are hereby incorporated by reference in their entirety as if fully set forth herein.

The invention relates to a walking floor for an armored vehicle with a double floor to protect against mine explosions, an armored vehicle having such a floor, and a method of producing a floor of this kind.

Armored vehicles are routinely fitted with a double floor to improve the protection of vehicle occupants during mine explosions. The lower floor disposed on the enemy side, also referred to as the anti-mine protection floor, thereby creates the underbody of the vehicle. The walking floor on which the vehicle occupants move and stand is disposed spaced apart from this on the friendly side. If a mine explodes, the lower floor, i.e. the anti-mine protection floor, becomes deformed. This causes the air in the space between the anti-mine protection floor and the walking floor to be sharply compressed, namely within a matter of milliseconds, so that there is a strong pressure surge acting on the walking floor. This may lead to high-frequency vibrations in the walking floor, which can be strong enough to cause fractures of the tibia in soldiers standing on the walking floor.

A generic walking floor is known from EP 1 754 949 A1, for example, which discloses an armored vehicle with a floor construction reinforced for anti-mine protection. The walking floor in the form of an inner floor panel is connected with stiffening members to the lower floor. The mechanical connection of the walking floor to the lower floor produces the risk that not only the lower floor, but also the walking floor, will be deformed if a mine is detonated. Moreover, the walking floor known in the art is configured as a metal plate, which transmits the vibrations occurring during the explosion to the soldiers without attenuation.

EP 2 180 288 A2 discloses a vehicle footrest with a deformable member for protecting against mine explosions. The deformable member comprises a plurality of side pieces, which connect the footrest to the floor. The side pieces become deformed in the event of a detonation, absorbing energy in the process. Effective vibration damping is not thereby possible. Moreover, the footrest only protects a spatially very limited area of the vehicle interior.

U.S. Pat. No. 4,404,889 and WO 03/058151 A1 disclose composite panels for the floor-side armoring of military vehicles to protect against mine detonations. However, these composite panels are not walking floors, but panels for the outer hull of an armored vehicle, the requirements of which are different from those of walking floors. The anti-mine protection floors known in the art are heavy due to the steel plates integrated in the composite.

The problem addressed by the invention is that of creating a walking floor for an armored vehicle having a double floor, wherein the walking floor can be combined with the anti-mine protection floor disposed on the enemy side of the armored vehicle and exhibits good attenuation properties with respect to vibrations which can be triggered by the detonation of a mine. The invention further addresses the problem of specifying an armored vehicle having a walking floor of this kind and also a method of producing a walking floor of this kind. Furthermore, a glass fiber honeycomb is to be specified which is generally suitable for the production of composite components and particularly for the production of a walking floor of this kind.

With respect to the walking floor, the problem is solved by the subject matter of claim 1. With respect to the armored vehicle, the problem is solved by the subject matter of claim 15, with respect to the production process by the subject matter of claim 18 and with respect to the glass fiber honeycomb by the subject matter of claim 2.

The basic idea underlying the invention is that of specifying a walking floor for an armored vehicle having a double floor for protecting against mine explosions, which comprises a composite panel having at least one core layer made of a honeycomb structure, which is arranged between a first and a second outer layer and is connected thereto. Retaining means for connecting the composite panel to the vehicle are integrated in the composite panel.

The walking floor according to the invention is low-vibration. In addition, it is possible to influence the floor's mechanical properties through a suitable choice of individual components of the composite panel, in order to take account of different technical requirements and commercial restrictions, so that walking floors with different protection levels can be constructed.

Advantageous embodiments of the invention are indicated in the dependent claims. Hence, the core layer may comprise glass fiber honeycombs, metal honeycombs, particularly aluminum honeycombs, aramid honeycombs or carbon fiber honeycombs. Glass fiber honeycombs and aluminum honeycombs are preferable and exhibit particularly good stiffening and absorption properties.

The first and second outer layers may be formed from the same or different materials. In the case of a symmetrically configured composite panel, both outer layers are formed from the same material, wherein in this case the core layer predominantly assumes stiffening functions. In the case of an asymmetrically configured composite panel in which both outer layers are formed from different materials, the core layer is reinforced as a crash absorber. In this case, the outer layer of the composite panel disposed on the enemy side, in other words the lower outer layer, may be more expandable than the outer layer disposed on the friendly side, that is, the upper outer layer. In other words, the upper outer layer is stiffer than the lower outer layer.

The first and/or second outer layer may comprise a fiberglass laminate, a carbon fiber laminate, an aramid layer, a ceramic layer or a metal sheet, particularly an aluminum sheet or a steel sheet. In the embodiment with the symmetrical composite panel, the two outer layers are made up of the same material or substance. In the asymmetric composite panel, the different materials referred to above may be combined with one another for the first and second outer layer, for example such that the lower outer layer is more expandable than the upper outer layer disposed on the friendly side.

One of the outer layers, particularly the outer layer disposed on the friendly side during use, may be connected to a spall liner to guard against fragments. The spall liner may be formed from aramid or polyethylene, for example, particularly from UHMWPE. The spall liner may be configured with or without a rubber coating, depending on the requirements. The spall liner is used to intercept small parts, such as stones, screws, etc., which are located in the intermediate floor area between the anti-mine protection floor and the walking floor.

These particles may act like projectiles and penetrate the walking floor when the mine explodes. The same applies to welded seams or screws and parts which are loosened when a mine is detonated and penetrate the walking floor as fragments, endangering the occupants. The attachment of a spall liner to the outer layer on the friendly side has proved an effective protection against fragments or particles of this kind, which ricochet off the side of the walking floor on the enemy side during a mine explosion. The rubber coating is used for additional attenuation and moreover acts as a seal, protecting against a NBC threat, for example.

Alternatively, one of the two outer layers or both outer layers may be configured as penetration protection, through setting a suitable layer thickness for example.

An anti-slip covering, particularly a floor covering, may be applied to the spall liner, for example a PVC covering or a corresponding covering. The floor covering may end flush with the composite panel or project beyond it, in order to be adhered to the vehicle structure by the customer, so that the walking floor is not directly visible as such straight from the vehicle interior.

In a preferred embodiment, an attenuating layer, particularly made from a gel, foam or rubber, is disposed on the spall liner or on what is the upper outer layer when in use. The protection of the occupants is thereby further improved. In the embodiment in which the anti-slip covering forms the end of the floor, the attenuating layer may be disposed between the anti-slip covering and the spall liner.

The retaining means for connecting the walking floor to the vehicle may comprise inserts and/or pottings and/or profiles known per se, which are inserted in the composite panel. The aforementioned retaining means are adapted in this case, both in terms of their form and also their configuration, such that the walking floor can be connected to the vehicle.

In a further embodiment, the outer layers and the core layer are connected by an adhesive film. The adhesive film may be adapted to set a large meniscus on the boundary surface between the outer layer and a honeycomb of the core layer. Within the framework of the invention a large meniscus can be identified optically with the naked eye and exhibits a concave curvature.

To set the meniscus, the adhesive film may exhibit a surface weight of at least $100$ g/m$^2$. The lower threshold of the surface weight of $100$ g/m$^2$ produces good wetting of the honeycomb, so that a large meniscus forms in the honeycomb or on the boundary surface with the honeycomb. On the one hand, good adhesion of the core layer to the outer layer is thereby achieved. On the other hand, the volume of the individual honeycombs of the core layer is reduced as little as possible by the space required by the adhesive layer, so that there is still free space in the honeycomb, which is conducive to the good crash absorption properties of the honeycomb. It has been demonstrated that an adhesive film with a surface weight of at least $100$ g/m$^2$ produces good results in relation to meniscus formation. A suitable adhesive film may, for example, be produced by a high proportion of resin.

The fiberglass laminate may comprise a thermoplastic adhesive film with a surface weight of $5$-$300$ g/m$^2$ and a Shore hardness of $25$-$200$ A. The modulus of elasticity in the machine direction lies between $1000$ MPa and $4000$ MPa, in the transverse direction between $800$ MPa and $4500$ MPa.

The fiber thickness of the fiberglass laminate advantageously corresponds to at least twice the adhesive film thickness. The adhesive film thickness may be between $5$ and $250$ µm. Through the use of adhesive films and woven fabrics or fibers with a given thickness, an air gap may be produced on the fibers of the outer layer, which gives the outer layer a certain additional elasticity with good stiffness.

The invention further relates to an armored vehicle with a walking floor as claimed in claim 1 and an anti-mine protection floor, wherein the walking floor is disposed spaced apart from the anti-mine protection floor and above the anti-mine protection floor. The existing advantages in relation to the walking floor come to bear here too.

In one embodiment of the vehicle, the walking floor and the anti-mine protection floor create an intermediate air-filled space which can be compressed by a mine explosion.

In a preferred embodiment, the walking floor is connected to a securing element in the vehicle, such that the walking floor is capable of vibrating during a mine explosion. Surprisingly, it has been shown that when the walking floor is supported so as to permit vibration, particularly low peak forces are transmitted to the occupants.

In this case, at least two opposite sides of the walking floor can preferably be connected to the securing element for the transmission of forces. At least two further opposite sides of the walking floor are freely disposed, such that the walking floor is capable of vibrating in the event of a mine explosion.

In addition, the invention is based on a method of producing a walking floor for an armored vehicle, in which for the production of a composite panel, a core layer made of a honeycomb structure is connected on both sides to a first and second outer layer and the composite panel is adapted to the shape of the vehicle interior, wherein retaining means for connecting the composite panel to the vehicle are integrated in the composite panel. In the case of fiberglass laminates, the outer layers may be made of dry woven fabric or non-crimp fabric. A dry woven fabric or non-crimp fabric is connected by adhesive films in this case. Alternatively, prepregs may be used, in other words, pre-impregnated fibers.

The invention is explained more closely with further details below with the help of exemplary embodiments making reference to the attached schematic drawings. In the figures.

Figure 1:
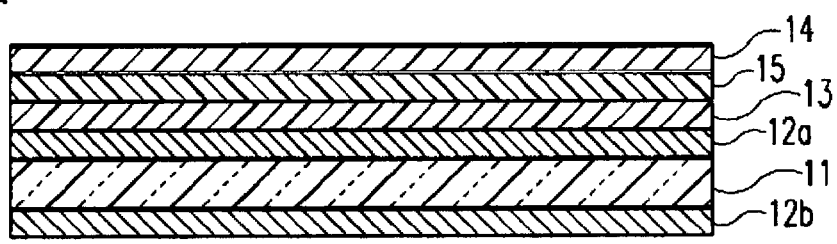
FIG. 1 shows a cross-section through a walking floor according to an exemplary embodiment of the invention with a symmetrically configured composite panel and FIG. 2 shows a cross-section through a walking floor according to a further exemplary embodiment according to the invention with an asymmetrically configured composite panel.

The walking floor illustrated comprises a composite panel 10, which is adapted for use in an armored vehicle 16 with a double floor 17. The walking floor 10 may be combined with a separate anti-mine protection floor, which is spaced apart in the fitted state, particularly an anti-mine protection floor in the form of a steel plate.

The walking floor 10 and the anti-mine protection floor together create the double floor or, generally, a multiple floor, in which the walking floor closes off the vehicle interior downwards. The double floor is known in the art.

In this case, both the walking floor adapted for the creation of a double floor for an armored vehicle per se, i.e. independently of the vehicle, and also an armored vehicle with a double floor, which exhibits a walking floor of this kind, is disclosed and claimed. The shape of the walking floor or else the outer contour of the walking floor is adapted to the vehicle interior or, generally speaking, to the contour of the inner parts of the vehicle in which the walking floor is used when assembled. The walking floor may run through the entire vehicle or else the interior. This is not obligatory, however, and is frequently not possible for design reasons. The walking floor may consist of individual floor segments, which are disposed beneath the vehicle occupants in the assembled state and can be combined with other, including traditional, floor segments to create the floor as a whole.

The walking floor has a composite structure and exhibits a composite panel 10, which comprises a core layer 11 and a first and second outer layer 12a, 12b. The unit made up of the core layer 11 and the two outer layers 12a, 12b may be repeated in the thickness direction of the composite panel, so that an alternating structure comprising core layers and outer layers results. It is possible, for example, for two or more core layers, particularly 3, 4 or 5 core layers to be provided, each of which are separated from one another by outer layers.

Figure 2:
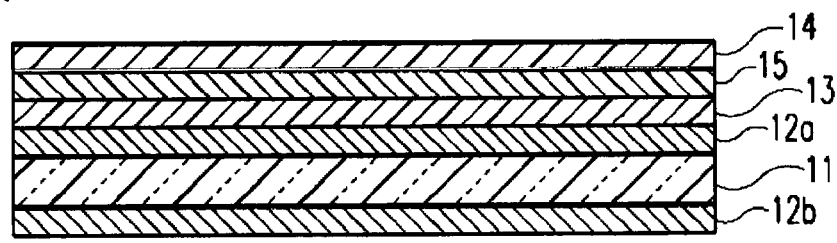
Figure 3:
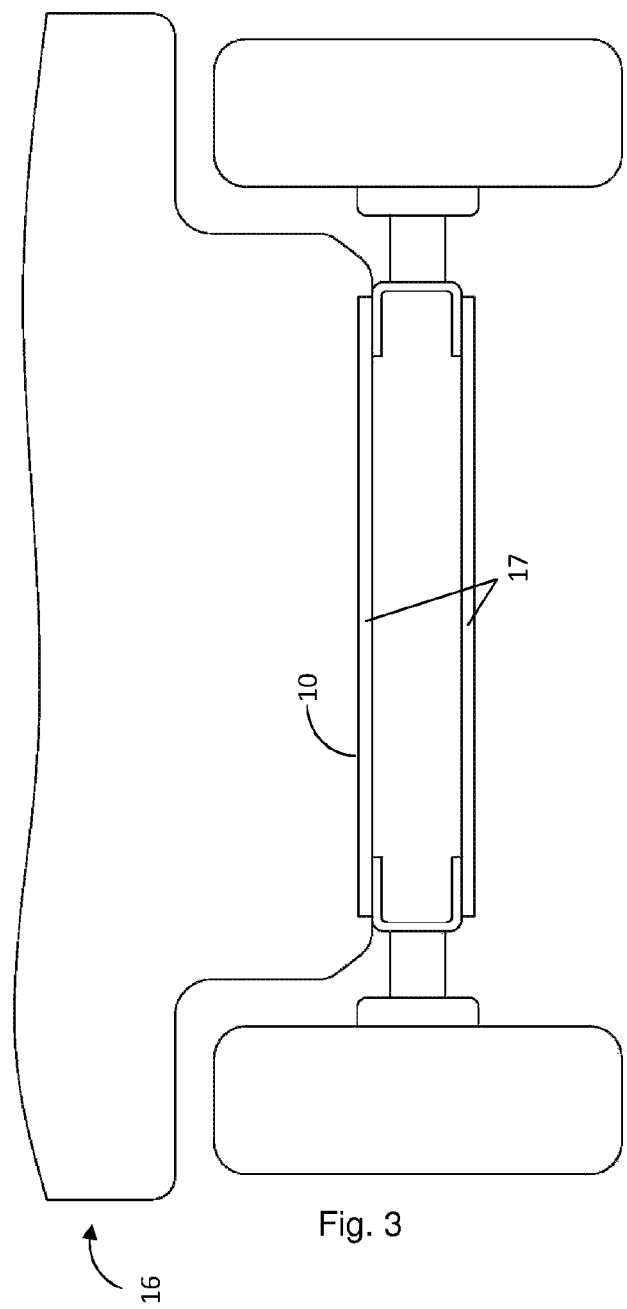
FIG. 3 shows a partial, cross-section of an armored vehicle with a double floor.
Figure 4:
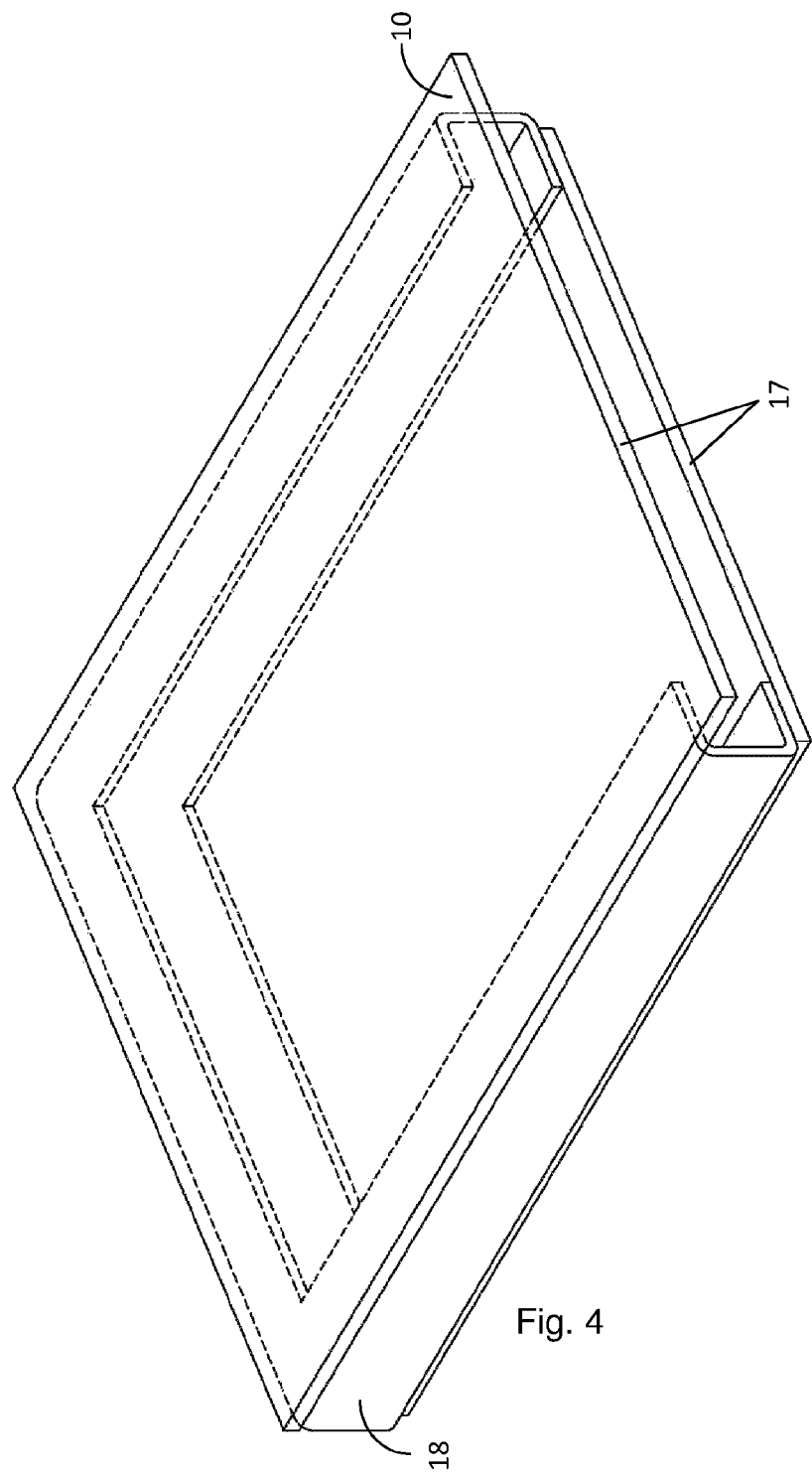
FIG. 4 shows a double floor and securing element according to one preferred embodiment.
Figure 5:
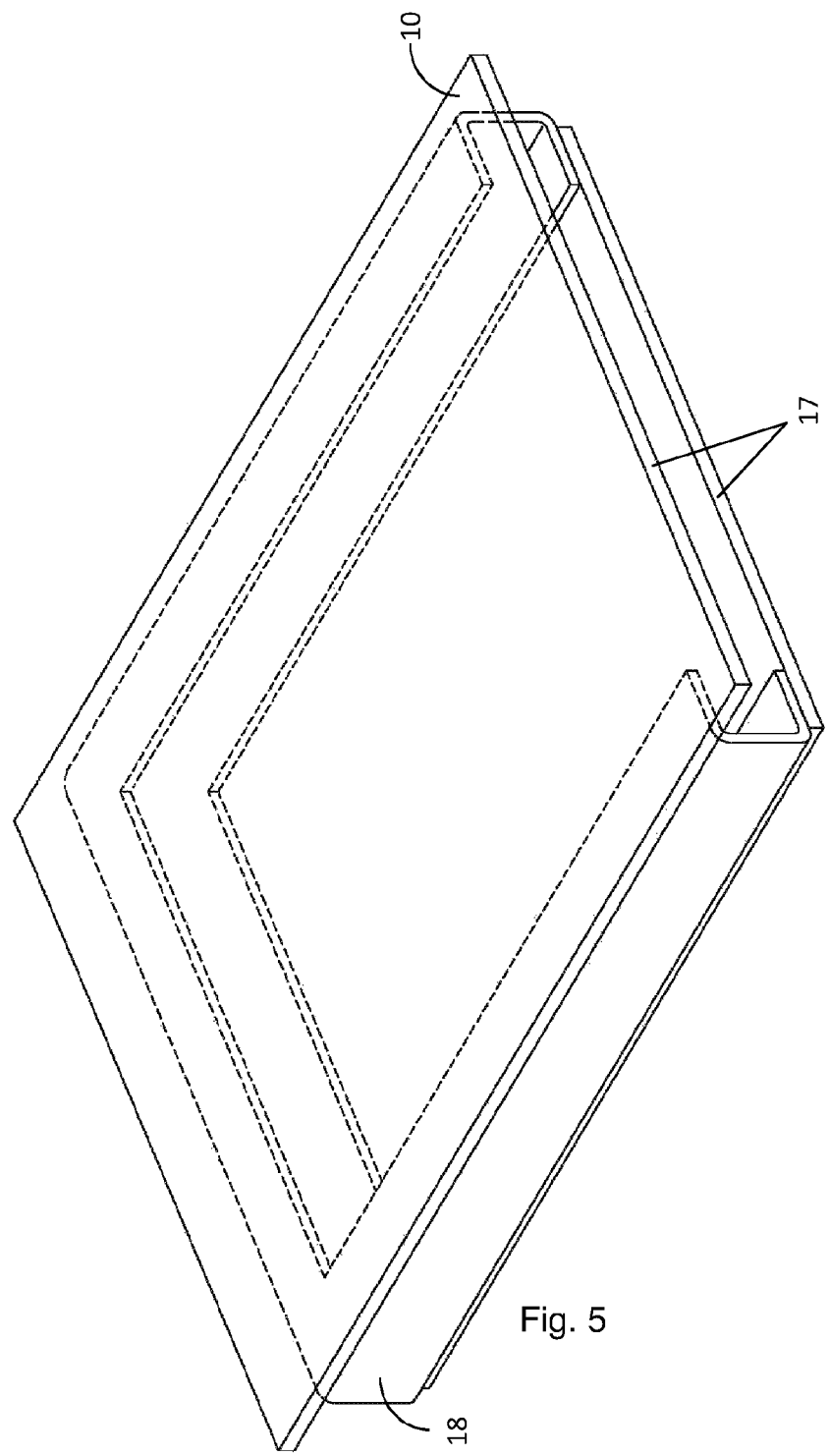
FIG. 5 shows a double floor and securing element according to a second preferred embodiment.

In the exemplary embodiment shown in FIGS. 1, 2, a single core layer 11 is provided, wherein an outer layer 12a, 12b is disposed on both sides of the core layer 11. The first upper outer layer 12a is disposed on the friendly side, i.e. in the direction of the vehicle interior. The lower second outer layer 12b disposed on the enemy side delimits the intermediate floor space between the walking floor and a lower anti-mine protection floor which is not shown. The core layer 11 exhibits a honeycomb structure. The core layer 11 is made up of honeycombs disposed alongside one another.

The honeycomb cores or the core layer made up of the honeycomb structure may comprise glass fiber honeycombs. There is no restriction here to a particular type of glass. E-glass, in other words the standard fiber customarily found on the market, or S-glass, or S2-glass, in other words higher strength fibers, are preferably used as the glass fibers. Fibers of this kind comprising E-glass, S-glass and S2-glass are known in the art. In addition, glass fibers made by Pohris®, as well as glass fiber products from HIPer-Tex® or Advantex® are used.

Alternatively, aluminum honeycombs or a core layer of aluminum honeycombs may be used, without being limited to a particular alloy. The following alloys are preferable: 3003, 5052, 5056 and 7000. In addition, it is possible for the core layer to be made of aramid honeycombs, without being limited to a particular aramid or para-aramid. Kevlar® and Nomex® are particularly preferably. Furthermore, polypropylene honeycombs or carbon fiber honeycombs can be used. Fiber-reinforced plastic honeycombs are generally possible.

The cell sizes are 1-50 mm, particularly at least 1 mm, at least 2 mm, at least 3 mm, at least 4 mm, at least 5 mm, at least 10 mm, at least 15 mm, at least 20 mm, at least 25 mm, at least 30 mm, at least 35 mm, at least 40 mm. The upper limit of the cell sizes may be 50 mm, particularly at most 45 mm, particularly at most 40 mm, particularly at most 35 mm, particularly at most 30 mm, particularly at most 25 mm, particularly at most 20 mm, particularly at most 15 mm, particularly at most 10 mm. A cell size in the range of 3.0-5.0 mm has proved particularly advantageous. The volumetric weight of the glass fiber honeycombs may be 20-300 kg/m$^3$. The lower limit may be 20 kg/m$^3$, particularly at least 30 kg/m$^3$, at least 40 kg/m$^3$, at least 50 kg/m$^3$, at least 60 kg/m$^3$, at least 70 kg/m$^3$, at least 80 kg/m$^3$, at least 90 kg/m$^3$, at least 100 kg/m$^3$, at least 110 kg/m$^3$, at least 120 kg/m$^3$, at least 130 kg/m$^3$, at least 140 kg/m$^3$, at least 15 kg/m$^3$, at least 160 kg/m$^3$, at least 170 kg/m$^3$, at least 180 kg/m$^3$, at least 190 kg/m$^3$, at least 200 kg/m$^3$, at least 210 kg/m$^3$, at least 220 kg/m$^3$, at least 230 kg/m$^3$, at least 240 kg/m$^3$, at least 250 kg/m$^3$. The upper limit of the volumetric weight of the glass fiber honeycombs is 300 kg/m$^3$, particularly at most 290 kg/m$^3$, particularly at most 280 kg/m$^3$, particularly at most 270 kg/m$^3$, particularly at most 260 kg/m$^3$, particularly at most 250 kg/m$^3$, particularly at most 240 kg/m$^3$, particularly at most 230 kg/m$^3$, particularly at most 220 kg/m$^3$, particularly at most 210 kg/m$^3$, particularly at most 200 kg/m$^3$. A particularly preferred range lies between 120 and 200 kg/m$^3$. The thickness of the honeycomb plates may be 2 mm-20 cm. The lower limit of the thickness of the honeycomb panels may be 2 mm, particularly at least 5 mm, particularly at least 1 cm, particularly at least 1.5 cm, particularly at least 2 cm, particularly at least 2.5 cm, particularly at least 3 cm, particularly at least 5 cm, particularly at least 10 cm, particularly at least 15 cm. The upper limit may be 20 cm, particularly at most 15 cm, particularly at most 10 cm, particularly at most 5 cm, particularly at most 3 cm. A preferred range for the thickness of the honeycomb panels lies between 1 cm and 3.5 cm, particularly between 1.5 cm and 3 cm.

The core layers referred to above comprising different materials, i.e. all the aforementioned honeycomb cores, may be combined with different outer layers, namely either into symmetrical composite panels or asymmetrical composite panels. It is possible in this case for the core layer and at least one, in particular both, outer layers to be formed from different materials. For example, the core layer may be formed from glass fiber honeycombs and at least one outer layer or both outer layers may be formed from a metallic material. It is also possible to create both the core layer and also the two outer layers from glass fiber materials. The core layer may also be formed from aluminum honeycombs and connected to glass fiber outer layers. Here, too, it is possible to combine the core layer of aluminum honeycombs for a symmetrical configuration of the composite panel with the same outer layers or for an asymmetric configuration with different outer layers.

Irrespective of the material used for the outer layers, for example in the case of outer layers made of glass fibers (GRP laminate) or in the case of outer layers made of other materials, production from dry woven fabric or dry non-crimp fabric, which is connected using adhesive films, is possible. Alternatively, it is possible to process a woven fabric or non-crimp fabric pre-impregnated with adhesive (prepreg.).

Possible adhesives are thermoplastic adhesive films with a surface weight of 5-300 g/m$^2$. The lower limit of the surface weight may be 5 g/m$^2$, particularly at least 10 g/m$^2$, at least 20 g/m$^2$, at least 30 g/m$^2$, at least 40 g/m$^2$, at least 50 g/m$^2$, at least 60 g/m$^2$, at least 70 g/m$^2$, at least 80 g/m$^2$, at least 90 g/m$^2$, at least 100 g/m$^2$, at least 110 g/m$^2$, at least 120 g/m$^2$, at least 130 g/m$^2$, at least 140 g/m$^2$, at least 150 g/m$^2$, at least 160 g/m$^2$, at least 170 g/m$^2$, at least 180 g/m$^2$, at least 190 g/m$^2$, at least 200 g/m$^2$. The upper limit of the surface weight of the thermoplastic adhesive films is 300 g/m$^2$, particularly at most 290 g/m$^2$, particularly at most 280 g/m$^2$, particularly at most 270 g/m$^2$, particularly at most 260 g/m$^2$, particularly at most 250 g/m$^2$, particularly at most 240 g/m$^2$, particularly at most 230 g/m$^2$, particularly at most 220 g/m$^2$, particularly at most 210 g/m$^2$, particularly at most 200 g/m$^2$, particularly at most 190 g/m$^2$, particularly at most 180 g/m$^2$, particularly at most 170 g/m$^2$, particularly at most 160 g/m$^2$, particularly at most 150 g/m$^2$, particularly at most 140 g/m$^2$, particularly at most 130 g/m$^2$, particularly at most 120 g/m$^2$, particularly at most 110 g/m$^2$, particularly at most 100 g/m$^2$. A preferred range is 70-150 g/m$^2$, particularly 72-144 g/m$^2$. The Shore hardness of the thermoplastic adhesive films is in a range of 25-200 A. The lower limit is 25 A, particularly at least 30 A, at least 40 A, at least 50 A, at least 60 A, at least 70 A, at least 80 A, at least 90 A, at least 100 A, at least 110 A, at least 120 A, at least 130 A, at least 140 A, at least 150 A.

The upper limit is 200 A, particularly at most 190 A, particularly at most 180 A, particularly at most 170 A, particularly at most 160 A, particularly at most 150 A, particularly at most 140 A, particularly at most 130 A, particularly at most 120 A, particularly at most 110 A, particularly at most 100 A, particularly at most 90 A, particularly at most 80 A, particularly at most 70 A, particularly at most 60 A, particularly at most 50 A. A particularly preferred range for the Shore hardness is 80-110 A. The film thickness of the individual thermoplastic adhesive films between the laminate layers lies in a range of 5 μm-250 μm. The lower limit of the film thickness is 5 μm, particularly at least 10 μm, particularly 15 μm, particularly at least 20 μm, particularly at least 25 μm, particularly at least 30 μm, particularly at least 40 μm, particularly at least 50 μm, particularly at least 60 μm, particularly at least 70 μm, particularly at least 80 μm, particularly at least 90 μm, particularly at least 100 μm. The upper limit of the film thickness is 250 μm, particularly at most 225 μm, particularly at most 200 μm, particularly at most 175 μm, particularly at most 150 μm, particularly at most 140 μm, particularly at most 130 μm, particularly at most 120 μm, particularly at most 110 μm, particularly at most 100 μm, particularly at most 90 μm, particularly at most 80 μm, particularly at most 70 μm, particularly at most 60 μm, particularly at most 50 μm. Depending on the adhesive film used in each case and the cloth used, 10-70% by wt. adhesive is used.

Traditional E-glass with a modulus of elasticity of approx. 70 to 80 GPa, particularly of approx. 72 GPa, traditional S-glass with a modulus of elasticity of approx. 80 to 90 GPa, particularly of approx. 87 GPa, traditional S2-glass and also the glass fibers HIPer-Tex® (E-glass with a modified chemical composition and therefore with a greater modulus of elasticity of approx. 90 GPa compared with traditional E-glass), the glass fibers Advantex®, (boron-free, corrosion-proof E-glass in which the resin surrounds the fibers and which achieves a higher modulus of elasticity of approx. 81 GPa compared with traditional E-glass) and glass fibers made by Pohris, which supply glass with a modulus of elasticity of approx. 100 GPa, are used as glass fibers for the outer layers for production of the GRP laminate. Glass fibers with a modulus of elasticity of approx. 70 to approx. 100 GPa can be used overall, wherein the range from approx. 90 GPa to approx. 100 GPa is preferred. The same or different types of glass may be used for the outer layers and honeycombs.

The aforementioned glass fibers may be combined with the aforementioned adhesives or with adhesives with the aforementioned properties. The fiber arrangement may be a plain weave, for example, particularly with warp or weft ribs, longitudinal or cross rib, panama weave. The fiber arrangement may be unidirectional. A twill weave or atlas weave is possible in this case. The aforementioned fiber arrangements may be combined with one another, particularly in different layers. The surface weight is 250-750 g/m². The lower limit is 250 g/m², particularly at least 300 g/m², particularly at least 350 g/m², particularly at least 400 g/m², particularly at least 450 g/m², particularly at least 500 g/m², particularly at least 550 g/m², particularly at least 600 g/m², particularly at least 650 g/m², particularly at least 700 g/m². The upper limit is 750 g/m², particularly at most 700 g/m², particularly at most 650 g/m², particularly at most 600 g/m², particularly at most 550 g/m², particularly at most 500 g/m², particularly at most 450 g/m², particularly at most 400 g/m², particularly at most 350 g/m², particularly at most 300 g/m². A particularly preferred range is 500-640 g/m².

The number of fiber layers in the GRP laminate may vary, namely from one to several hundred layers. The thickness of the outer layers is in a range of 5 μm to 8 cm, particularly in a range of 1 mm-4 cm, particularly 2 mm-3 cm. The individual layers may be differently oriented to one another, such that a quasi-isotropic outer tier or outer layer results. It is also possible to produce tiers of outer layers anisotropic to one another.

The thicknesses of the adhesive films and the individual fabric layers or individual fibers are coordinated with one another, such that a gap is created at the fibers of the outer layer or gaps form between the respective laminate layers. This is achieved in that the fiber thickness is at least twice the adhesive film thickness or is greater than twice the adhesive film thickness. This results in part of the adhesive film at least partially embedding a lower fiber and another part of said adhesive film the next higher fiber. Since twice the adhesive film thickness is smaller than the fiber thickness, a gap is produced between the two adhesive films. The fiber is thereby enclosed in a sandwich form of adhesive, which does not surround the fibers completely, however, but leaves a gap free. The outer layer thereby acquires additional elasticity with good stiffness.

An adhesive film with a high resin content displaying a surface weight of at least 100 g/m², for example, may be used for the connection of the outer layers 12a, 12b to the core layer 11. The lower limit of the adhesive's surface weight is 100 g/m², particularly at least 120 g/m², particularly at least 140 g/m², particularly at least 160 g/m², particularly at least 180 g/m², particularly at least 200 g/m², particularly at least 210 g/m², particularly at least 220 g/m², particularly at least 240 g/m², particularly at least 260 g/m², particularly at least 280 g/m². The upper limit of the adhesive film's surface weight is 300 g/m², particularly at most 280 g/m², particularly at most 260 g/m², particularly at most 240 g/m², particularly at most 220 g/m², particularly at most 200 g/m², particularly at most 180 g/m², particularly at most 160 g/m², particularly at most 140 g/m², particularly at most 120 g/m². The surface weight of the adhesive film preferably falls within a range of 100-300 g/m², particularly within a range of 180 g/m². In this way, particularly good wetting of the honeycomb walls with adhesive is achieved and the largest possible meniscus forms on the boundary surface to the honeycomb. A fixed connection is achieved between the outer layer and the core layer through the large meniscus. Moreover, the volume of the honeycomb is filled with as little adhesive as possible, in order to retain the free volume of the honeycomb for the mechanical properties of the walking floor, for example as a crash zone.

The preferred material for producing the outer layers 12a, 12b are GRP laminates. Other possible materials include CRP laminates, particularly made of PAN-based, pitch-based, vapor-grown carbon fibers, ceramics, particularly aluminum oxide, silicon carbide, boron carbide, steel, particularly armor steels, aluminum, without being limited to a particular alloy, aramid and para-aramid, particularly Kevlar®, Nomex®, Twaron®.

In the case of symmetrically structured composite panels, both outer layers 12a, 12b comprise the same materials. It is possible in this case for the thickness of the outer layers likewise to be identical or also different in configuration, such that one outer layer is stronger than the other outer layer. The same applies to asymmetrically configured composite panels in which the two outer layers can likewise exhibit the same thickness or different thicknesses, wherein the asymmetrical composite panels are composed of different materials, however.

A spall liner 13, which acts as a fragment shield, may be optionally arranged on the outer layer 12a disposed on the friendly side, i.e. on the first outer layer 12a, which is arranged on the top in the installed state. The spall liner may be produced from aramids or derivatives thereof, particularly Kevlar®, Nomex® and Twaron®. It is also possible for the spall liner 13 to be made of Ultra-High-Molecular-Weight Polyethylene (UHMWPE), also known as High-Modulus Polyethylene (HMPE) or High-Performance Polyethylene (HPPE). The aforementioned materials may be rubber-coated or applied to the first outer layer 12a of the walking floor in pure form. It is also possible to use the walking floor with a three-layer construction, i.e. with only the core layer 11 and the two outer layers 12a, 12b. In this case, the first outer layer 12a, which is arranged at the top during use, is that layer of the walking floor on which the soldiers or occupants of the armored vehicle stand.

The optional spall liner 13 increases protection from exploded fragments or loose objects located in the intermediate floor area, such as screws or stones. The rubber-coated spall liner 13 has the further advantage that the additional rubber coating produces further attenuation of the pressure surge from the exploding mine. Moreover, the rubber coating of the spall liner creates protection from an NBC assault and seals the floor. The spall liner may end flush with the walking floor or project beyond it. In the latter case, adhesion to the vehicle's floor structure is possible without holes emerging between the walking floor and the floor structure. The thickness of the spall liner is variable and depends on the respective threat requirements. The thickness range of the spall liner may be between 0.3 mm and 20 mm. The lower limit is 0.3 mm, particularly at least 0.6 mm, particularly at least 0.9 mm, particularly at least 1.2 mm, particularly at least 1.5 mm, particularly at least 2 particularly at least 5 mm, particularly at least 10 mm. The upper limit is 20 mm, particularly at most 15 mm, particularly at most 10 mm, particularly at most 5 mm, particularly at most 4 mm, particularly at most 3 mm, particularly at most 2 mm.

In the exemplary embodiment according to FIG. 1 or FIG. 2, an attenuating element or an attenuating layer 15 and an anti-slip floor covering thereon, made of PVC or a similar material, for example, is provided on the spall liner 13. The attenuating element 15 is arranged on the spall liner 13 and below the non-slip covering 14. The following are used as attenuating elements for pressure surges and vibrations: gel (particularly gel mats, gel studs, etc.), foam and rubber. The thickness of the attenuating layer 15 may range from 2 mm to 2 cm. A single layer or a composite attenuator made of different attenuators stacked on top of one another (e.g. first a rubber mat followed by a gel mat) is possible. Alternatively, the floor covering 14 may be arranged directly on the spall liner 13 or directly on the upper outer layer 12a. The same applies to the floor covering 14 and the attenuating element 15 as to the spall liner 13, which may be provided flush with or projecting beyond the floor covering or core layer 11, so that said floor covering can be adhered to the vehicle structure. The floor covering is connected to the walking floor by adhesion and compression at a higher temperature or in the autoclave at a higher temperature.

If the walking floor is configured without a spall liner, the attenuating element 15 is located directly on the upper outer layer of the honeycomb panel in use and beneath the anti-slip covering 14. It is disclosed in connection with all exemplary embodiments and also generally in connection with the invention that the outer layers 12a, 12b are arranged directly on the core layer 11 or are directly connected to the core layer 11.

To connect the walking floor or the composite panel 10 to a vehicle or the floor structure of a vehicle, retaining means are integrated in the composite panel (not shown). These may be inserts and profiles, for example. An insert is a threaded insert subsequently glued into place in the composite panel, particularly a metallic threaded insert. The basic shape of the insert is cylindrical with two flanges on the front faces. Through suitable openings in one of the flanges, insertion and venting bores are created, through which the insert can be glued into place in a corresponding hole in the composite panel. Inserts of this kind are known per se.

The retaining means may additionally comprise pottings, in other words areas in which the honeycombs are filled with an epoxy resin-based plastic compound. The potting compound has a pasty consistency in the mixed raw state, so that the honeycombs can be selectively filled. The filling of the honeycomb cells may be used, for example, for the partial increase in pressure resistance of the composite panel and/or for the partial introduction of bores and/or as an edge seal. The potting compounds are known per se.

The arrangement of the retaining means in the walking floor and the shape of the walking floor are adapted, such that the walking floor can be inserted in the mounting provided for this in the vehicle interior. The same applies to the configuration of the walking floor as a floor segment.

The method of producing the walking floor involves the use of the procedure known per se for the production of a honeycomb structure, in which a film made from a honeycomb material, for example Nomex®, Kevlar®, glass fibers or aluminum, is printed with lines of adhesive, which are arranged such that a plurality of films arranged on top of one another connected into a stack each exhibit lines of adhesive arranged in an offset manner relative to one another. After the film stack has been compressed into a block, it is mechanically expanded and stabilized, as a result of which the honeycomb form is created due to the arrangement of the adhesive lines known per se. The raw honeycomb block is coated with plastic which is cured. The honeycomb layers are then cut out of the block. One or a plurality of honeycomb layers create the core layer 11, which is connected, particularly glued, to the first and second outer layer. This takes place through hot or cold compression or in the autoclave.

The exemplary embodiments of the invention described above comprise low-vibration walking floors, which are provided for use in an armored vehicle in connection with an anti-mine protection floor. The individual features of the walking floors according to the different exemplary embodiments described above are disclosed both individually and also in combination with one another. In addition, the use of a walking floor according to claim 1 or according to one of the exemplary embodiments referred to above for an armored vehicle with a double floor is disclosed and claimed.

In a preferred embodiment of the vehicle 16, the walking floor 10 is arranged spaced apart from the anti-mine protection floor, i.e. on the friendly side. Air is located in the intermediate space between the walking floor 10 and the anti-mine protection, which is compressed in the event of a mine explosion due to the deformation of the anti-mine protection floor. The pressure surge arising due to the rapid air compression acts on the walking floor 10, such that forces act on the occupants located inside the vehicle 16, particularly on the shins of said occupants. A significant reduction in shin impact is achieved if the walking floor 10 is suspended in such a manner that it is capable of vibrating during a mine explosion. To achieve this, the walking floor 10 is only connected to a securing element 18 of the vehicle 16 in sections. The sections of the walking floor 10 which are not connected to the vehicle securing element 18 can vibrate freely. The securing 18 element may be a frame, for example, on which the walking floor 10 lies and to which it is secured. The frame is not circumferential in design, but only extends along a partial periphery of the walking floor 10. The part of the walking floor 10 not connected to the frame is free. It is also possible for the walking floor 10 to be directly connected to the vehicle walls. Here, too, a partial periphery of the walking floor 10 is freely disposed. The vibration capability of the walking floor 10 therefore depends on sides or, generally, a partial periphery or at least one partial section, particularly a plurality of partial sections of the periphery of the walking floor 10 being freely movable. This can be achieved, for example, in that at least two opposite sides of the walking floor 10 are mechanically connected to the securing element 18. At least two further opposite sides of the walking floor 10 are freely disposed. This means that the free sides of the walking floor 10 are not connected to or in contact with the securing element 18 or other parts of the vehicle 16, so that the free sides of the walking floor 10 are relatively movable with respect to the vehicle 16. Overall, the walking floor 10 is capable of vibrating during a mine explosion due to this freely vibrating suspension. The shorter sides of the walking floor 10, generally the sides of the walking floor 10 arranged transversely to the longitudinal axis of the vehicle 16, are advantageously rigidly connected to the securing element 18 or to the vehicle 16. The long sides of the walking floor 10, generally the sides of the walking floor 10 extending in the longitudinal direction of the vehicle 16, are freely arranged. If the walking floor 10 is configured in segments, the long sides of the walking floor segments, which are freely arranged, may extend transversely to the longitudinal direction of the vehicle 16. The short sides are then arranged and fixed in the longitudinal direction of the vehicle 16.

An air gap relative to the adjacent vehicle parts of at least one, particularly of several centimeters, specifically of 2, 3, 4, 5 or more than 5 centimeters, is advantageously provided along the free sides for the vibration capability of the walking floor. The non-vibrating sides of the walking floor may be secured by screw-fastening or in a material-connected manner. A suspension-bridge-type construction results overall, wherein through a suitable choice of material the bending strength of the walking floor can be adapted to the total supporting weight.

The combination of a walking floor, which comprises a composite panel 10 with at least one core layer 11 made up of a honeycomb structure, which is arranged between a first and a second outer layer 12a, 12b, with the vibratable mounting of the walking floor in the armored vehicle means that the bend-resistant walking floor exhibits sufficient strength due to the honeycomb structure, in order to carry the total weight of the occupants of the vehicle. The vibratable suspension of the walking floor takes account of the flexibility of the material, as a result of which a significant improvement in the absorption of the forces occurring during a mine explosion is achieved.

It has been shown with explosive tests according to STANAG 3b (mine: 8 Kg TNT, centrally located) that the maximum apparent load can be reduced to 2.7 kN or 1.9 kN, which lies significantly below the permitted threshold values. These forces act directly on the walking floor, which exhibits a glass fiber honeycomb structure. Moreover, one and the same floor could be subject to an explosion according to STANAG 3b three times without said floor sustaining lasting damage, for example in the form of a buckling of the morphology or of the structural integrity.

In addition, a glass fiber honeycomb is disclosed, which exhibits good mechanical and chemical properties. This honeycomb is suitable for production of the walking floor without being limited to this application. Other applications in which good crash behavior is important are possible. It is made clear that the walking floor can be produced with other honeycombs, particularly with other glass fiber honeycombs made from E-glass, S-glass or S2-glass, for example.

The glass fibers of the honeycomb exhibit the following composition in % by weight:

| | |
|---|---|
| 14-16.5 | $Al_2O_3$ |
| 0.8-1.2 | $TiO_2$ |
| 10-12 | $CaO$ |
| 4-6 | $MgO$ |
| 0.8-1.5 | $ZnO$ |
| 0.1-0.3 | $Na_2O$ |
| 0.1-0.2 | $Fe_2O_3$ |
| 0.1-0.3 | $Li_2O$ |
| 0.2-0.3 | $CeO_2$ |
| 0.1-0.2 | $F_2$ |
| Remainder | $SiO_2$ |

The $SiO_2$ content is specifically 62-66% by wt. The glass fibers are embedded in a plastic matrix made of epoxy resin, for example, in a manner known per se to create a fiber composite material. The fibers may be present in the form of a woven fabric or a non-crimp fabric. Reference is made to the above explanations with regard to the method of production. The glass fiber honeycombs are disclosed in connection with a honeycomb core or a honeycomb-like core layer, in connection with a component made of a composite honeycomb material and specifically disclosed in connection with the walking floor described above.

The advantage of these fibers is that they exhibit a modulus of elasticity of 100.0 GPa, as well as very good water resistance and very good acid resistance.

The invention claimed is:

1. A walking floor for an armored vehicle with a double floor to protect against mine explosions, wherein the walking floor comprises a composite panel having at least one core layer made of a honeycomb structure, which is arranged between a first and a second outer layer and is connected thereto, wherein retaining means for connecting the composite panel to the vehicle are integrated in the composite panel, wherein the walking floor lies upon a securing element in the vehicle, such that in a connected condition the walking floor is configured to vibrate during a mine explosion, wherein the securing element comprises a frame that extends around a partial periphery of the walking floor such that at least a side of the walking floor is free from contact with the securing element.

2. The walking floor as claimed in claim 1, wherein the core layer comprises glass fiber honeycombs, metal honeycombs, particularly aluminum honeycombs, aramid honeycombs or carbon fiber honeycombs.

3. The walking floor as claimed in claim 1, wherein the first and second outer layer are formed from the same or different materials.

4. The walking floor as claimed in claim 1, wherein the first and/or second outer layer comprise a fiberglass laminate, a carbon fiber laminate, an aramid layer, a ceramic layer or a metal sheet.

5. The walking floor as claimed in claim 4, wherein the fiberglass laminate comprises a thermoplastic adhesive film with a surface weight of 5-300 g/m2 and a Shore hardness of 25-200 A.

6. The walking floor as claimed in claim 4, wherein the fiber thickness of the fiberglass laminate corresponds to at least twice the adhesive film thickness.

7. The walking floor as claimed in claim 4, wherein the adhesive film thickness is 5-250 µm.

8. The walking floor as claimed in claim 1, wherein one of the outer layers, particularly the outer layer disposed on the friendly side during use, is connected to a spall liner to guard against fragments.

9. The walking floor as claimed in claim 5, wherein the spall liner is formed from aramid or UHMWPE.

10. The walking floor as claimed in claim 5, wherein the spall liner has a rubber coating.

11. The walking floor as claimed in claim 1, wherein the side of the composite panel disposed on the friendly side during use exhibits an anti-slip floor covering.

12. The walking floor as claimed in claim 1, wherein an attenuating layer, particularly made from a gel, foam or rubber, is disposed on the spall liner or on one of the outer layers.

13. The walking floor as claimed in claim 1, wherein the retaining means comprise inserts and/or pottings and/or profiles, which are inserted in the composite panel.

14. The walking floor as claimed in claim 1, wherein the outer layers and the core layer are connected by an adhesive film, wherein the adhesive film exhibits a surface weight of at least 100 g/m2 in order to set a large meniscus on the boundary surface between the outer layer and a honeycomb of the core layer.

15. An armored vehicle with a walking floor as claimed in claim 1 and further comprising an anti-mine protection floor, wherein the walking floor is disposed spaced apart from the anti-mine protection floor and above the anti-mine protection floor.

16. The vehicle as claimed in claim 15, wherein the walking floor and the anti-mine protection floor create an intermediate air-filled space which can be compressed by a mine explosion.

17. The vehicle as claimed in claim 16, wherein at least two opposite sides of the walking floor are connected to the securing element tor the transmission of forces and at least two further opposite sides of the walking floor are freely disposed, such that the walking floor is capable of vibrating in the event of a mine explosion.

18. A method of producing a walking floor for an armored vehicle, in which for the production of a composite panel, a core layer made of a honeycomb structure is connected on both sides to a first and second outer layer and the composite panel is adapted to the shape of the vehicle interior, wherein retaining means for connecting the composite panel to the vehicle are integrated in the composite panel such that when the walking floor is connected to a securing element in the vehicle, the walking floor is capable of vibrating during a mine explosion, wherein the securing element comprises a frame that at least two opposite sides of the walking floor lie upon and at least two further opposite sides of the walking floor are free from contact with the securing element.

19. A walking floor for an armored vehicle with a double floor to protect against mine explosions, wherein the walking floor comprises a composite panel having at least one core layer made of a honeycomb structure, which is arranged between a first and a second outer layer and is connected thereto, wherein retaining means for connecting the composite panel to the vehicle are integrated in the composite panel, wherein the walking floor is connectable to a securing element in the vehicle, such that in a connected condition the walking floor is configured to vibrate during a mine explosion, wherein the securing element comprises a frame that at least two opposite sides of the walking floor lie upon for the transmission of forces and at least two further opposite sides of the walking floor are free from contact with the securing element.

* * * * *